United States Patent
Lee et al.

(10) Patent No.: US 12,159,985 B2
(45) Date of Patent: Dec. 3, 2024

(54) HEAT SINK FIXATION THROUGH PLASTIC MELTING

(71) Applicant: CPS Technology Holdings LLC, New York, NY (US)

(72) Inventors: Eric Kar Wai Lee, Antioch, IL (US); Chang Liu, Shanghai (CN)

(73) Assignee: CPS Technology Holdings LLC, New York, NY (US)

( * ) Notice: Subject to any disclaimer, the term of this patent is extended or adjusted under 35 U.S.C. 154(b) by 578 days.

(21) Appl. No.: 17/603,522

(22) PCT Filed: Apr. 17, 2020

(86) PCT No.: PCT/US2020/028761
§ 371 (c)(1),
(2) Date: Oct. 13, 2021

(87) PCT Pub. No.: WO2020/214948
PCT Pub. Date: Oct. 22, 2020

(65) Prior Publication Data
US 2022/0190417 A1 Jun. 16, 2022

Related U.S. Application Data

(60) Provisional application No. 62/835,765, filed on Apr. 18, 2019.

(51) Int. Cl.
*H01M 10/613* (2014.01)
*H01M 10/0525* (2010.01)
(Continued)

(52) U.S. Cl.
CPC ..... *H01M 10/613* (2015.04); *H01M 10/0525* (2013.01); *H01M 10/6554* (2015.04);
(Continued)

(58) Field of Classification Search
CPC .......... H01M 10/613; H01M 10/0525; H01M 10/6554; H01M 50/209; H01M 50/271;
(Continued)

(56) References Cited

U.S. PATENT DOCUMENTS

| 11,296,381 B2 * | 4/2022 | Miler .................. H01M 10/613 |
| 2008/0113262 A1 * | 5/2008 | Phillips ............... H01M 10/482 |
| | | 429/149 |

(Continued)

FOREIGN PATENT DOCUMENTS

| CN | 104220286 A | 12/2014 |
| CN | 104733795 A | 6/2015 |

(Continued)

OTHER PUBLICATIONS

International Search Report and Written Opinion of the International Searching Authority dated Jul. 8, 2020 for PCT/US2020/028761 filed Apr. 17, 2020, 82 pages.

*Primary Examiner* — Abdullah A Riyami
*Assistant Examiner* — Nader J Alhawamdeh
(74) *Attorney, Agent, or Firm* — Boardman & Clark LLP

(57) ABSTRACT

A battery housing for a battery module is disclosed. The battery housing has a plurality of exterior walls surrounding a base forming an internal section which is configured to receive one or more battery cells. The internal section has a bottom surface. A heat sink is joined to the bottom surface of the battery housing by a plastic deformation of a portion of the housing. A cover encloses the internal section of the battery housing. A battery module and a method of installation of a heat sink in a battery housing are also disclosed.

22 Claims, 11 Drawing Sheets

(51) Int. Cl.
  *H01M 10/6554* (2014.01)
  *H01M 50/209* (2021.01)
  *H01M 50/271* (2021.01)
  *H01M 50/289* (2021.01)

(52) U.S. Cl.
  CPC ....... *H01M 50/209* (2021.01); *H01M 50/271* (2021.01); *H01M 50/289* (2021.01); *H01M 2220/20* (2013.01)

(58) Field of Classification Search
  CPC ........... H01M 50/289; H01M 2220/20; H01M 50/24; H01M 10/04; H01M 2220/10; Y02P 70/50; Y02E 60/10
  See application file for complete search history.

(56) References Cited

U.S. PATENT DOCUMENTS

| | | |
|---|---|---|
| 2014/0186693 A1 | 7/2014 | Tyler et al. |
| 2014/0272517 A1 | 9/2014 | Glasgow et al. |
| 2014/0302368 A1* | 10/2014 | Wang ................... H01M 50/552 429/99 |
| 2015/0263398 A1 | 9/2015 | Tanaka et al. |
| 2015/0364799 A1* | 12/2015 | Miller ..................... H02J 50/80 320/108 |
| 2017/0365888 A1* | 12/2017 | Kwon ............... H01M 10/4207 |
| 2019/0157636 A1* | 5/2019 | Miler ..................... H01M 50/30 |
| 2022/0190417 A1* | 6/2022 | Lee ..................... H01M 50/271 |
| 2023/0124560 A1* | 4/2023 | Elison ................ H01M 50/293 429/120 |

FOREIGN PATENT DOCUMENTS

| | | |
|---|---|---|
| CN | 105009321 A | 10/2015 |
| CN | 205542913 U | 8/2016 |
| CN | 107004794 A | 8/2017 |
| CN | 206820037 U | 12/2017 |
| CN | 108023138 A | 5/2018 |
| CN | 108270048 A | 7/2018 |
| CN | 207883776 U | 9/2018 |
| EP | 2637234 A1 | 9/2013 |
| JP | 2002329483 A | 11/2002 |
| KR | 101720108 B1 | 3/2017 |

* cited by examiner

HEAT SINK FIXATION THROUGH PLASTIC MELTING

CROSS-REFERENCE TO RELATED APPLICATIONS

This application is a national phase filing of International Patent Application No. PCT/US2020/028761 entitled "HEAT SINK FIXATION THROUGH PLASTIC MELTING," which has an international filing date of Apr. 17, 2020, and claims priority to U.S. Provisional Patent Application, Ser. No. 62/835,765 filed Apr. 18, 2019, entitled "HEAT SINK FIXATION THROUGH PLASTIC MELTING", the entire contents of each of which are content hereby incorporated by reference herein for all purposes.

BACKGROUND

The present disclosure generally relates to the field of batteries and battery modules. More specifically, the present disclosure relates to heat sinks. The present disclosure more specifically relates to heat sinks for batteries, such as lithium ion batteries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Further, a micro-hybrid electric vehicle (mHEV) also uses a "Stop-Start" system similar to the mild hybrids, but the micro-hybrid systems of a mHEV may or may not supply power assist to the internal combustion engine. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

In addition to use in vehicles (e.g., vehicles, boats, trucks, motorcycles, and airplanes), advances in battery technology and rechargeable batteries are more frequently being used in what may be referred to as stationary battery applications. Applications for stationary batteries, which are often used in backup or supplemental power generation, are becoming more widespread with improvements in rechargeable aspects of batteries and with the lowering of prices for such technology. For example, stationary batteries may be utilized for industrial and/or household applications. Such applications may include DC power plants, substations, back-up power generators, transmission distribution, solar power collection, and grid supply.

Batteries, such as lithium ion batteries, are sensitive to low and high temperatures. Thus, it is important to regulate the cells and battery packs to remain in a desired temperature range for optimum performance and life. It is also important to reduce uneven distribution of temperature throughout a battery pack, which could lead to reduced performance. Likewise, it is important to eliminate or reduce the potential for uncontrolled temperature buildup or thermal runaway. Accordingly, a device or system for thermal management is desired.

One common device for use in thermal management is a heat sink. Current devices use screws or other fixation devices or over-molding a heat sink in order to capture the heat sink in a plastic battery housing. Unfortunately, screws and fixation devices risk damaging the cell should an overheating event or impact event occur. Further, in known over-molding processes issues arise during the manufacturing process, namely, trying to retain a heat sink in place while over-molding the plastic battery housing. For example, molding pressures may cause the heat sink to shift in the molding tool.

Therefore, a need exists for a battery module, battery housing, and system having a heat sink, as well as a method of manufacturing or installation of a heat sink which meets the needs of thermal management and overcomes one or more of the deficiencies of prior devices and processes.

SUMMARY

Accordingly, a battery housing for a battery module is disclosed. The battery housing has a plurality of exterior walls surrounding a base forming an internal section which is configured to receive one or more battery cells. The internal section has a bottom surface. A heat sink is joined to the bottom surface of the battery housing by a plastic deformation of a portion of the housing. A cover encloses the internal section of the battery housing.

A battery module is also disclosed. The battery module comprises a battery housing having a plurality of exterior walls surrounding a base forming an internal section which receives one or more battery cells. The internal section has a bottom surface. A heat sink is joined to the bottom surface of the battery housing by a plastic deformation of a portion of the housing. A plurality of battery cells are seated on top of the heat sink in the internal section. A cover encloses the internal section and plurality of battery cells.

A method of installation of a heat sink in a battery housing for a battery module is also disclosed. The method includes the steps of: providing a battery housing comprised of plastic and having an internal section formed by a plurality of exterior walls surrounding a base, the internal section having a bottom surface; installing a heat sink on a heating fixture; moving a heating fixture with installed heat sink into the internal section of the battery housing; pressing the heat sink into the bottom surface while heating with the heating fixture to at least partially melt the plastic and affix the heat sink to the housing; and removing the heating fixture from the housing.

Accordingly, a heat sink and fixation method for a battery is provided which solves one or more of the deficiencies with existing devices. The heat sink and fixation method provides improved consistency of fixation of the heat sink to the battery housing. For example, the disclosed heat sink and fixation method may allow for the battery housing material to melt over the heat sink for robust connection between the heat sink and battery housing. Further, the disclosed in various embodiments may allow for ease of manufacture. In addition, the disclosed may allow for no extraneous fixation devices such as screws to be introduced into the battery housing, preventing risks of puncture and damage to battery cells (which may be a particular risk when the battery used is in a vehicle and an accident or impact occurs).

These and other features and advantages of devices, systems, and methods are described in, or are apparent from, the following detailed descriptions and drawings of various examples of embodiments.

BRIEF DESCRIPTION OF DRAWINGS

Various examples of embodiments of the systems, devices, and methods will be described in detail, with reference to the following figures, wherein.

Figure 1:
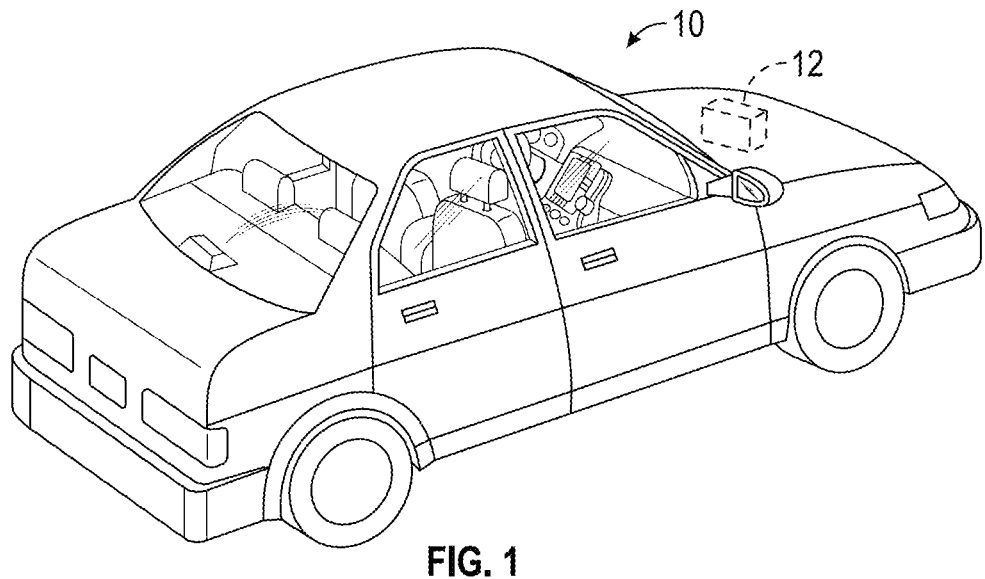
FIG. 1 is a perspective view of a vehicle having a battery module according to one or more examples of embodiments described herein.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

Referring to the Figures, a heat sink, a battery housing, a battery module, a system, and a method for fixation of a heat sink in a battery and a battery housing are disclosed.

The battery, battery module, and battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of a xEV. As another example, battery modules in accordance with present embodiments may be incorporated with or provide power to stationary power systems (e.g., non-automotive systems).

Based on the advantages over traditional gas-powered vehicles, manufactures, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. In accordance with aspects of the present disclosure, since traditional gas-powered vehicles are designed to utilize 12 volt battery systems, a 12 volt or 48 volt lithium ion battery may be used to supplement a 12 volt lead-acid battery. More specifically, the 12 volt or 48 volt lithium ion battery may be used to more efficiently capture electrical energy generated during regenerative braking and subsequently supply electrical energy to power the vehicle's electrical system.

As advancements occur with vehicle technologies, high voltage electrical devices may also be included in the vehicle's electrical system. For example, the lithium ion battery may supply electrical energy to an electric motor in a mild-hybrid vehicle. Often, these high voltage electrical devices utilize voltage greater than 12 volts, for example, up to 48 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

To help illustrate, FIG. 1 is a perspective view of an embodiment of a vehicle 10. As discussed above, it would be desirable for a battery system 12 to be largely compatible with traditional vehicle designs. Accordingly, the battery system 12 may be placed in a location in the vehicle 10 that may house a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12. While specific examples of locations are described, one of skill in the art will appreciate that variations thereon would also be acceptable for the purposes provided.

Figure 2:
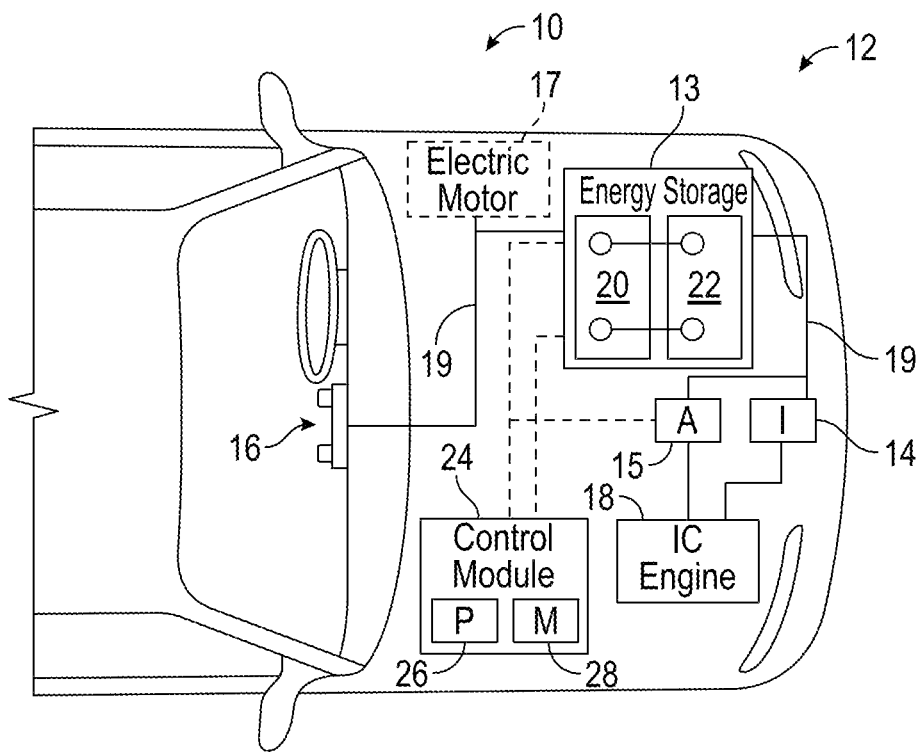
FIG. 2 is a schematic view of a battery system for use with a vehicle according to one or more examples of embodiments described herein.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells 110. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

In accordance with the present disclosure, the housing 100 of the battery module 20 includes one or more covers 102, 104 configured to seal or cover the housing 100. For example, referring to FIG. 4, the housing 100 may include a lateral cover 102 that fits over a lateral side 106 of the housing 100, where the lateral side 106 of the housing 100 retains, for example, a printed circuit board (PCB) and other electrical components (not shown) of the battery module 20. An upper cover 104 may be disposed over the upper side 108 of the housing 100 to seal or cover the upper side 108 of the housing 100. The upper cover 104 of the housing 100 may include various features, such as but not limited to, a handle for transport and/or a vent path which allows the scape of gases or fluids, and the like (not shown).

Figure 3:
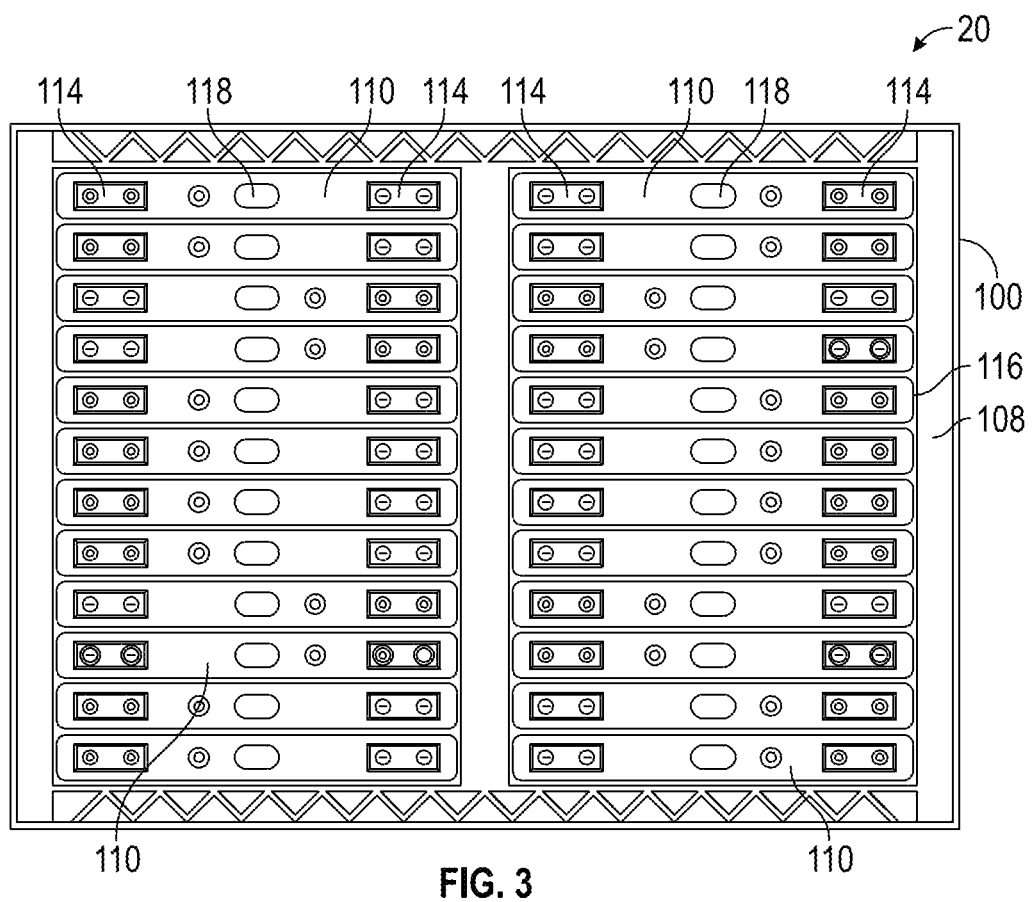
FIG. 3 is partial top plan view of a battery module according to one or more examples of embodiments, with the cover removed to show a plurality of battery elements or cells in the housing.

In accordance with embodiments of the present disclosure, the battery module 20 may include a housing 100 (e.g., plastic housing) configured to retain electrochemical cells 110 (e.g., prismatic lithium-ion [Li-ion] electrochemical cells) within an inside of the housing 100 (see FIG. 3). The housing 100 illustrated and described herein may contain multiple stacks of prismatic lithium-ion (Li-ion) electrochemical cells 110. The battery module 20 may include any number of electrochemical cells 110 (e.g., 2, 3, 4, 5, 6, 7, 8, 9, 10, or more electrochemical cells), any type of electrochemical cell (e.g., Li-ion, lithium polymer, lead-acid, nickel cadmium, or nickel metal hydride, prismatic, and/or cylindrical), and any arrangement of the electrochemical cells 110 (e.g., stacked, separated, or compartmentalized).

As will be discussed herein, battery elements or electrochemical cells 110 may be provided atop a heat sink 112. The electrochemical cells 110 may include terminals 114. The electrochemical cells 110 may be inserted into the housing 100 through the openings 116 in the upper side 108 of the housing 100, and positioned within the housing 100 such that the terminals 114 of the electrochemical cells 110 are disposed in the opening. A bus bar carrier (not shown) may be disposed into the opening and may retain bus bars (not shown) disposed thereon, where the bus bars are configured to interface with the terminals 114 of the electrochemical cells 110. For example, the bus bars may interface with the terminals 114 to electrically couple adjacent electrochemical cells 110 together. Depending on the embodiment, the bus bars may couple the electrochemical cells 110 in series, in parallel, or some of the electrochemical cells 110 in series and some of the electrochemical cells 110 in parallel. Further, certain of the bus bars may be configured to electrically couple the electrically interconnected group of electrochemical cells 110 with major terminals 114 of the battery module 20, where the major terminals 114 are configured to be coupled to a load (e.g., component(s) of the vehicle 10) to power the load. The electrochemical cells 110 may also include vents 118 configured to enable gases from within the electrochemical cells 110 to vent into the inside of the housing 100 in certain operating conditions (e.g., if a pressure within one or more individual electrochemical cell exceeds a cell venting pressure threshold of the corresponding one or more individual electrochemical cells).

The use of plastics may be desirable for use in lithium ion battery modules. For instance, plastics are usually considered lightweight, water resistant, and may be constructed to have strengths that approach or even exceed certain metal constructions. Thermoplastics are a type of plastic material that becomes pliable when subjected to a temperature above a predefined threshold (based on the particular thermoplastic material) to allow plastic deformation and melting. This temperature may be referred to as the glass transition temperature ($T_g$). When a thermoplastic is below its $T_g$, it is solid. Thermoplastics are generally considered to be resistant to shrinkage, durable, and strong. Accordingly, in one or more examples of embodiments, the battery module 20 may include a housing 100 that is constructed of thermoplastic.

Referring to FIGS. 5-9, one or more examples of a battery housing 100 are shown. The battery housing 100 comprises an enclosure having a plurality of exterior walls 120, e.g., four exterior walls, and a base 122 or bottom. In some examples of embodiments, the battery housing 100 may be divided into a plurality of battery compartments or sections 124. In the illustrated embodiment, the battery housing 100 is divided into four internal sections 124 by a number of interior walls 126. As shown, an internal section 124 is made up of at least two interior walls 126 or interior wall segments 127, and an interior surface or portion 121 of the at least two exterior walls 120 or exterior wall segments. While four internal sections 124 are shown, it is understood that any number of internal sections may be provided, namely, one or more, without departing from the disclosure herein. The battery housing 100 may be comprised of material such as, but not limited to, polypropylene.

Figure 9:
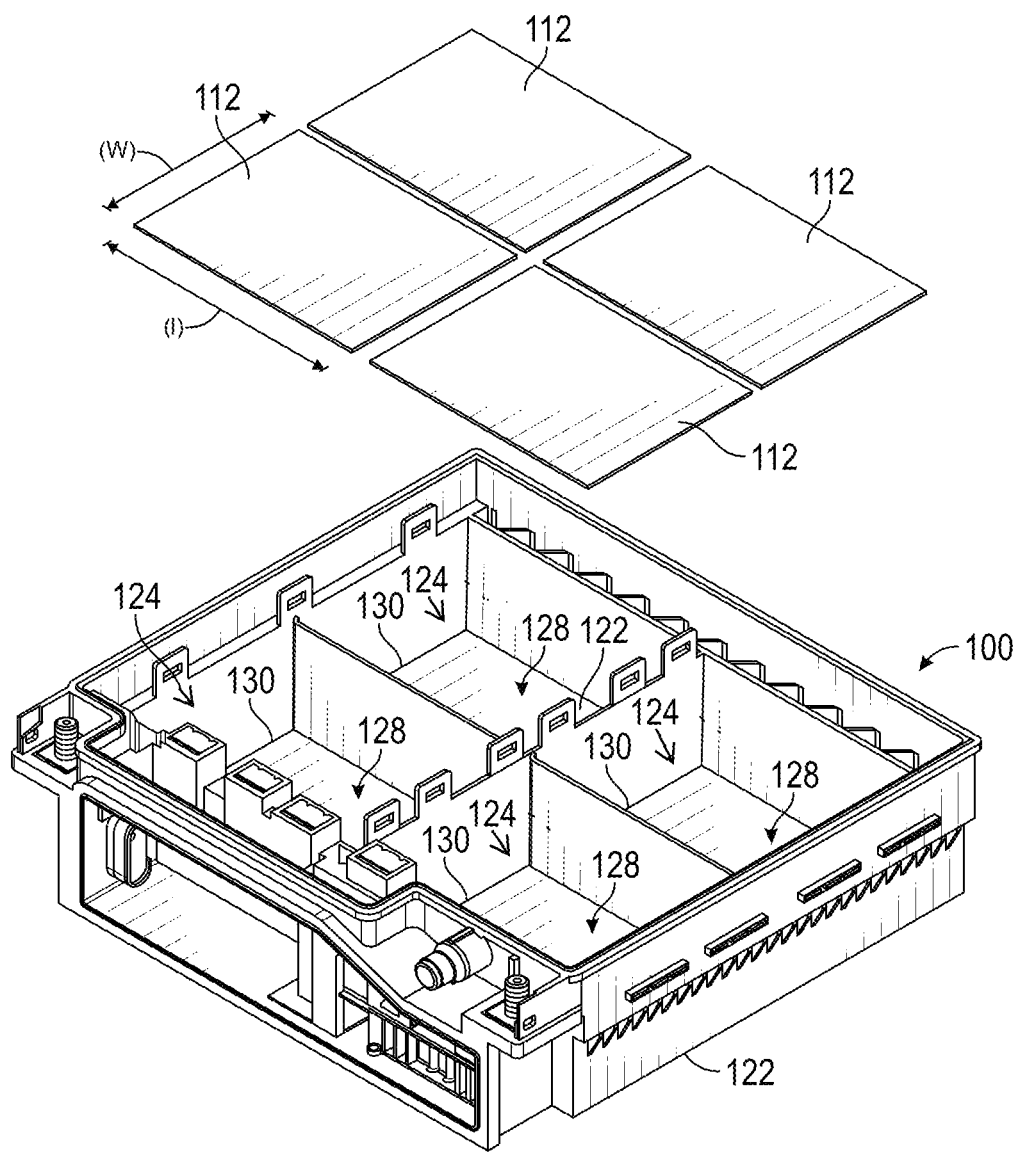
FIG. 9 is an exploded perspective view of the battery housing shown in FIG. 5, showing the heat sink(s) separated from the housing.

A heat sink 112 is provided on the base 122 or bottom surface 128 of an internal section 124 of the housing 100. To this end, one or more heat sinks 112 may be provided in the battery housing 100. In the illustrated examples, a heat sink 112 is shown along a bottom surface 128 of each internal section 124. As shown in FIG. 9, the heat sink 112 illustrated in the examples of embodiments shown in FIGS. 5-9 is generally a planar, flat plate having a width (w) and length (l) corresponding to the width and length of the internal section 124, such that the heat sink 112 extends to the walls 120, 121, 126, 127 forming the internal section 124. That is, when installed in the housing 100 the heat sink(s) 112 are positioned along a bottom interior surface 128 of the battery housing 100 and span from and between the interior walls 126 and exterior walls 120. The heat sink 112 may be constructed of known materials capable of delivering the functions of a heat sink. For example, the heat sink 112 may be an aluminum plate. However, it is understood that various materials may be used to accomplish these functions and the foregoing is presented as an example only.

Figure 5:
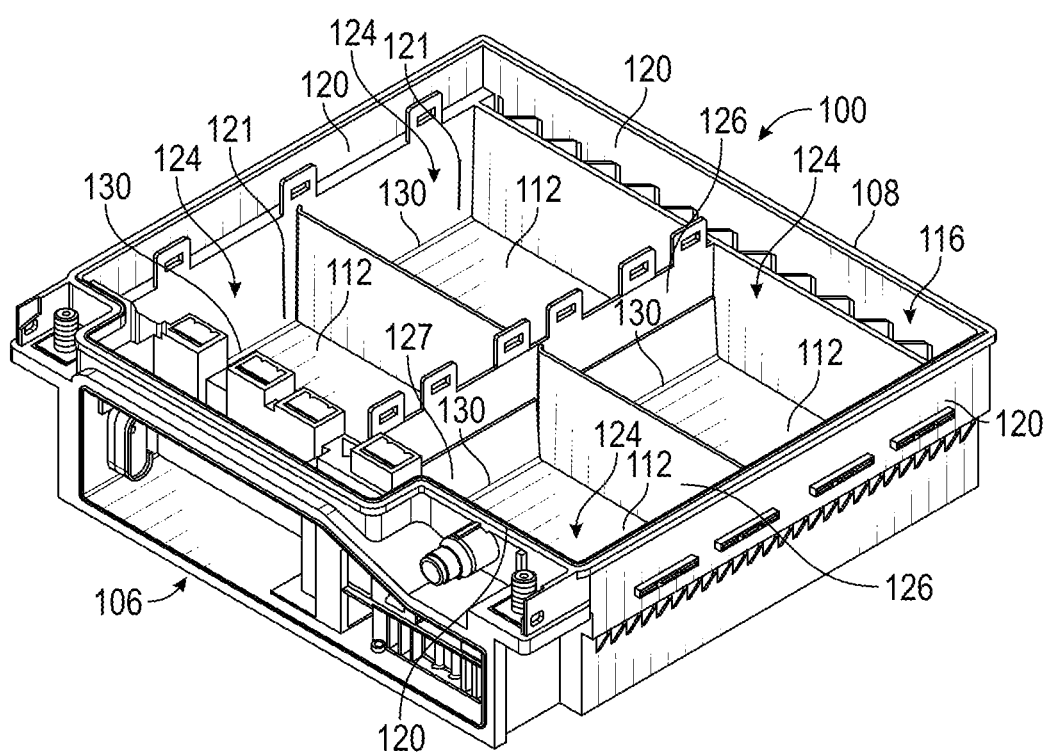
FIG. 5 is a perspective view of a battery housing for use with a battery module according to one or more examples of embodiments, showing the cover removed and one or more examples of a heat sink inserted therein.
Figure 6:
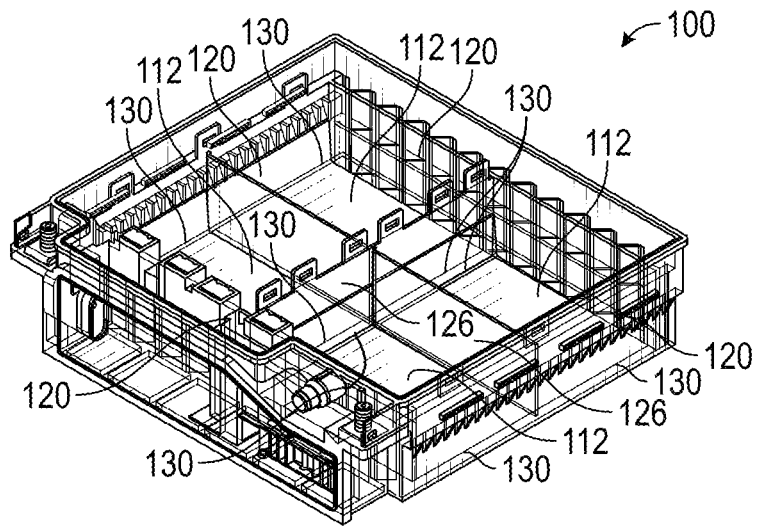
FIG. 6 is a perspective, partially transparent view of the battery housing shown in FIG. 5.
Figure 7:
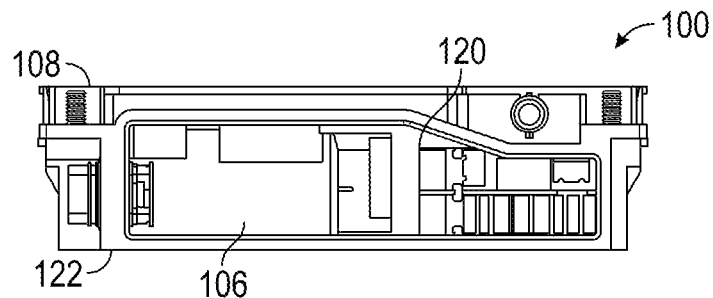
FIG. 7 is a front elevation view of the battery housing shown in FIG. 5.
Figure 8:
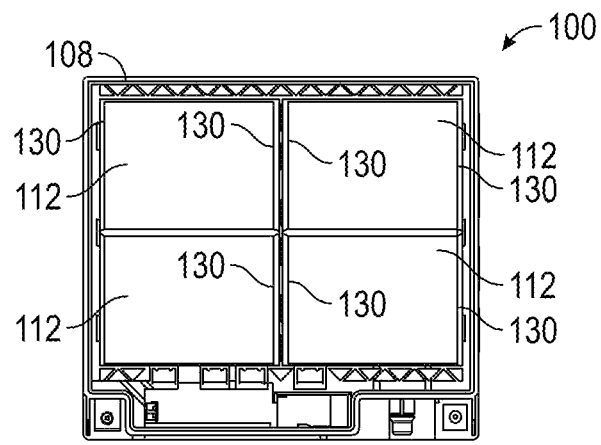
FIG. 8 is a top plan view of the battery housing shown in FIG. 5.

In one or more examples of embodiments, the battery housing 100 may further comprise one or more, or a plurality of ribs 130 (see FIG. 5). In one or more examples of embodiments, the ribs 130 are formed integral with the housing 100 and may be formed of the same material as the housing 100. A rib 130 extends along the bottom interior edge of one or more of the exterior walls 120 and bottom edge of one or more of the interior walls 126. In the illustrated embodiment, a plurality of ribs 130 are provided in each internal section 124. In one example, the ribs 130 are provided on opposing wall surfaces such that they are spaced apart and may be generally parallel to each other on opposite sides of the internal section 124. However, it is understood that the ribs 130 may be provided at any location and orientation suitable for accomplishing the intended purposes. The ribs 130 retain or assist in retaining a heat sink 112 in place on the bottom surface 128 of the housing 100. More specifically, the ribs 130 are plastically deformed ribs which retain the heat sink 112 in position. Namely, when the heat sink 112 is installed, the ribs 130 may generally have a partial "mushroom" shape which connects to the bottom surface 128 of the housing 100, surrounds an edge (or both edges) of the heat sink 112, and extends over a portion of the top surface of the heat sink 112. In this manner, the ribs 130 fix the heat sink 112 completely to the housing 100.

While specific examples of shapes and materials and locations are described, variations and combinations of suitable materials, shapes and configurations, should likewise be understood as within the scope of the disclosure.

Figure 4:
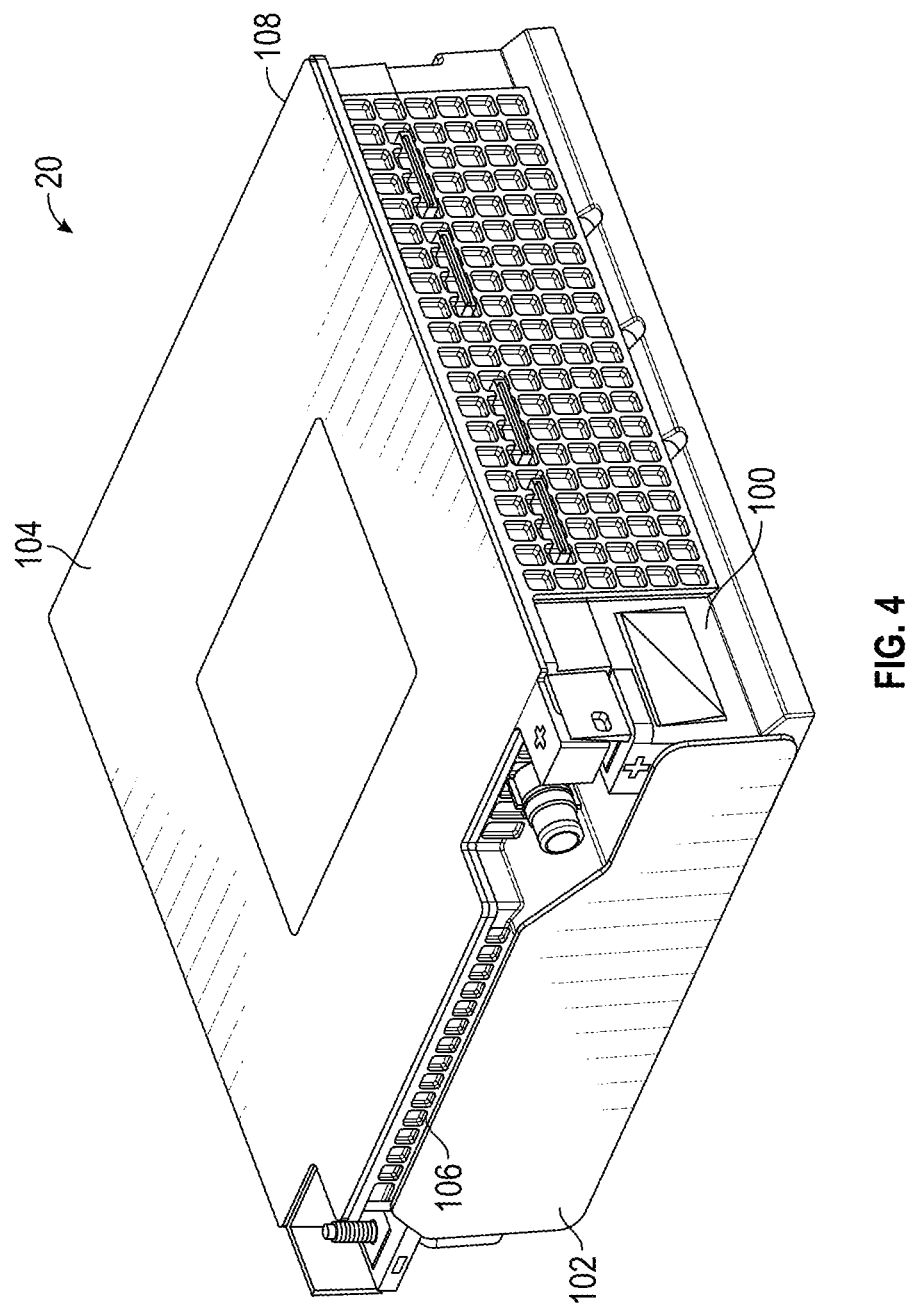
FIG. 4 a perspective view of a battery module according to one or more examples of embodiments.
Figure 11:
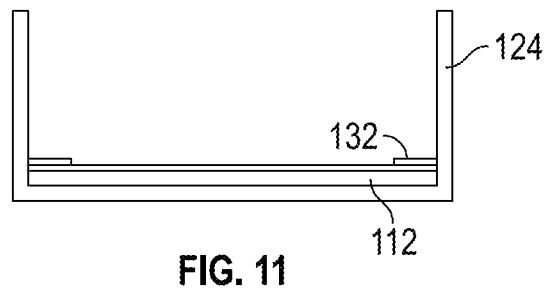
FIG. 11 illustrations a partial cross section view of a battery housing with heat sink and isolation component according to one or more examples of embodiments.

As discussed herein, one or more battery cells 110 may be provided into each internal section 124 (see example shown in FIG. 4). In one or more examples of embodiments, the battery cells 110 may be provided seated above or on top of the heat sink 112. In some examples of embodiments, the cells 110 may also be electrically isolated from the heat sink 112, for example, using an isolation component 132. In FIG. 11, an isolation component 132 is illustrated in cross-section. Generally, the isolation component 132 may be sheet or other device providing a separation between the battery cells 110 and the bottom surface 128 of the housing 100 and/or the attached heat sink 112. This isolation sheet 128 may also impart certain structural advantages such as, but not limited to, more consistent attachment to the battery housing 100.

Figure 10:
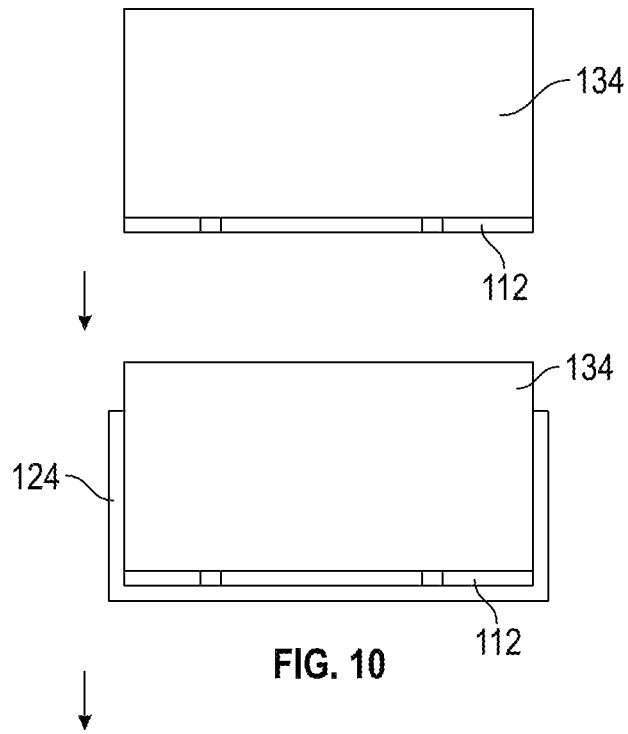
FIG. 10 illustrates a partial cross section, step view of the insertion of a heating fixture and heat sink into the battery housing according to one or more examples of embodiments.
Figure 12:
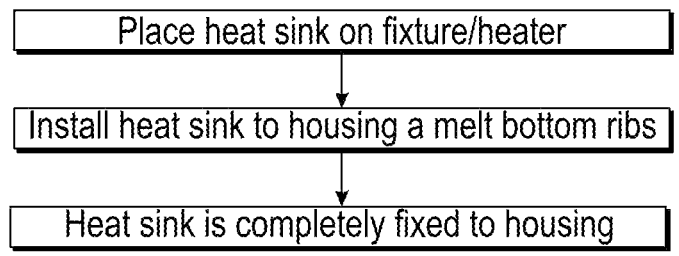
FIG. 12 is an example workflow of a method for providing a heat sink into a battery housing according to one or more examples of embodiments.
Figure 13:
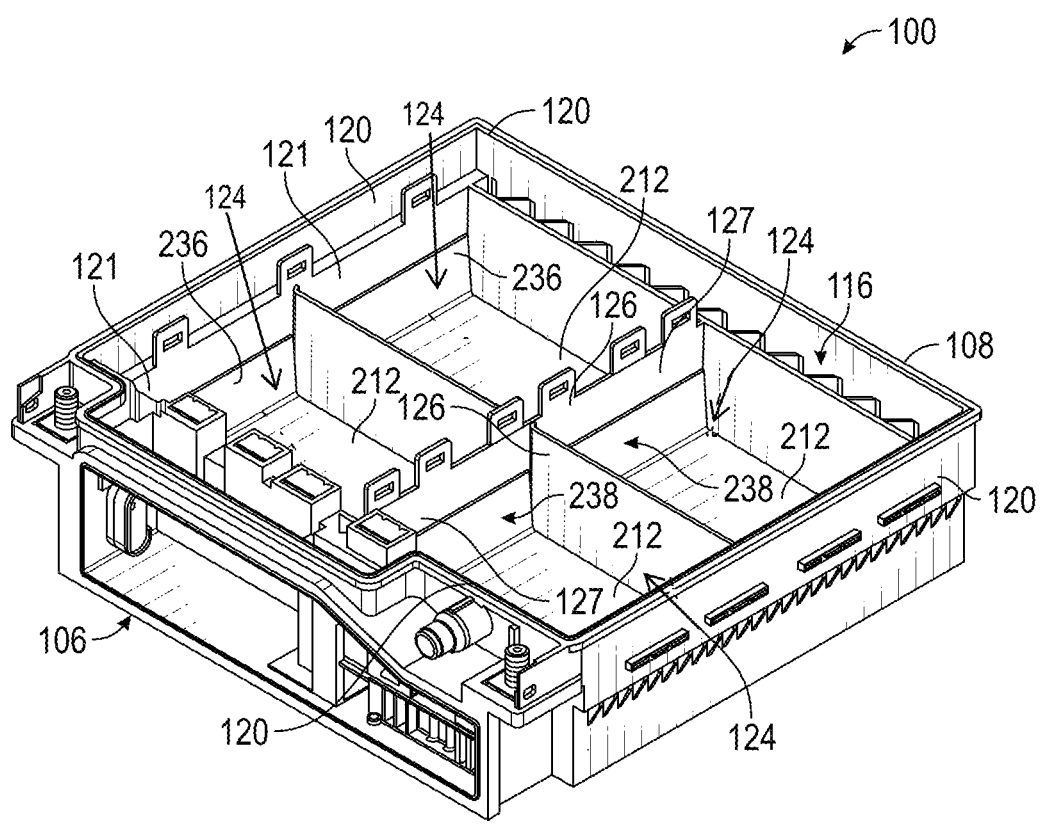
FIG. 13 is a perspective view of a battery housing for use with a battery module according to one or more examples of embodiments, showing the cover removed and one or more alternative examples of a heat sink inserted therein.
Figure 14:
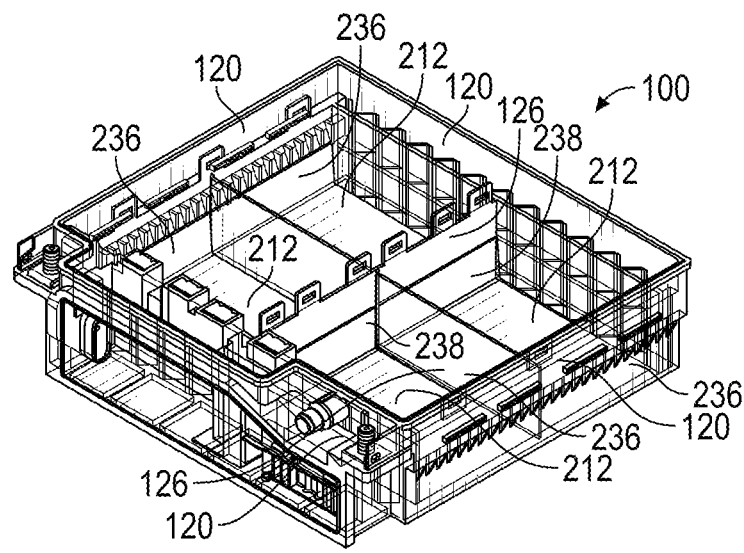
FIG. 14 is a perspective, partially transparent view of the battery housing shown in FIG. 5.
Figure 15:
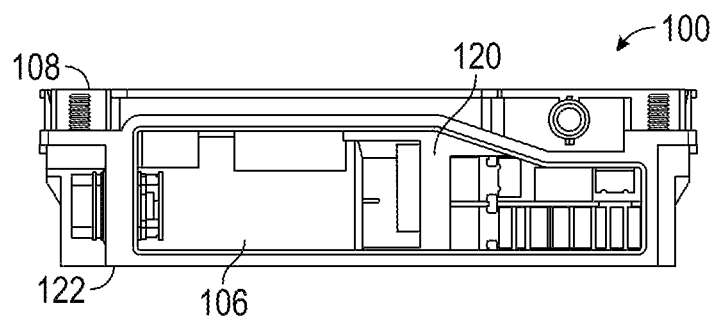
FIG. 15 is a front elevation view of the battery housing shown in FIG. 5.
Figure 16:
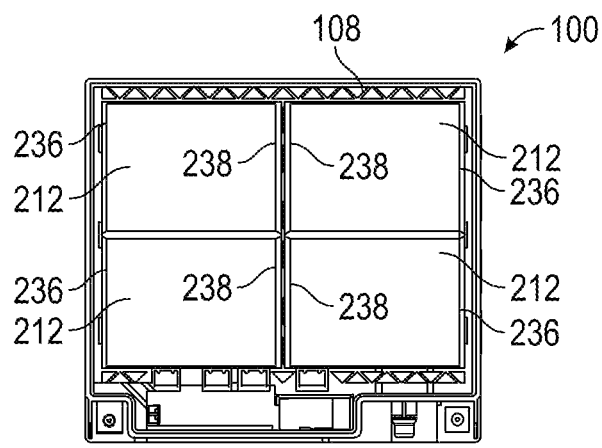
FIG. 16 is a top plan view of the battery housing shown in FIG. 5.

Referring to FIGS. 10-12, a system and method of installation of the heat sink 112 into the battery housing 100 described in FIGS. 5-9 will be discussed. Accordingly, a battery housing 100 may be provided. First, the heat sink 112, which may be a planar plate, may be installed onto or attached to a heating fixture 134. In various embodiments, the heating fixture 134 is a fixture or heater suitably sized and configured to deliver heat to sufficiently heat the heat sink 112 for the purposes disclosed herein. The heating fixture 134 may be heated to a suitable temperature to heat the heat sink 112 plate to a temperature which may induce at least partial melting or plastic deformation of the housing material in the internal section 124 (such as for example a rib 130 or surface 128 or wall 120, 126). The melting temperature may be a temperature sufficient to heat the plastic or thermoplastic but not warp the heat sink 112. For example, in various embodiments, the heating element may be at least 100 degrees Celsius. The heat sink 112 is placed on the heating fixture 134. In one or more examples of embodiments, the heating fixture 134 may be comprised of a tool-grade stainless steel block, although variations thereon which accomplish the purposes provided would also be acceptable. While specific examples are provided, one of skill in the art will appreciate variations thereon may also be acceptable.

Next, the heating fixture 134 and the plate or heat sink 112 may be provided into (e.g., lowered) into the battery housing 100. The plate 112 and fixture 134 are provided together into a battery housing 100 and pressed into the battery housing 100. As shown in the illustrated example of FIG. 10, the heat sink 112 remains attached to the fixture 134 when inserted into the battery housing 100. Insertion is made into an internal section 124 of the battery housing 100. The heat from the fixture 134 may then transfer through the plate (heat sink 112) and into the battery housing 100, melting the plastic (for example, but not limited to, polypropylene or thermoplastic), and creating a robust joint between the heat sink plate 112 and battery housing 100. That is, the heating fixture 134 may at least partially melt the battery housing 100 in the internal section 124, for example, the battery housing ribs 130 and/or bottom surface. As the heat sink 112 is provided in the battery housing 100, the battery housing material may be understood to melt slightly, allowing for the plastic material, such as the rib, to "mushroom" over a portion of the top surface of the heat sink 112 or plastically deform and fasten the heat sink 112 in place. In some examples of embodiments, an amount of force may be applied by the fixture 134 and heat sink 112 plate being pressed into the battery housing 100, toward the bottom of the housing 100, which, along with the application of heat presses the plate into the bottom surface plastic and causes the melting rib to mushroom over the heat sink 112. After a predetermined amount of time, the fixture 134 is then raised or removed from the housing 100, leaving the heat sink 112 attached to the bottom of the battery housing 100. In some examples of embodiments, an isolation component or sheet 132 may subsequently be provided to separate the heat sink 112 and battery element or cell(s) 110.

The assembly of heat sink 112 to housing 100 described hereinabove, in various embodiments, simplifies the joint between the battery housing 100 and heat sink 112. The consistent interface between the heat sink 112 and battery housing 100 also optimizes heat transfer from the heat sink 112 to the battery housing 100 and out to the external environment.

One or more alternative examples of embodiments are shown in FIGS. 13-17 with like elements including like reference numerals. In the alternative embodiments shown, a battery housing 100 having exterior walls 120 and a base 122 or bottom is illustrated. One or more interior walls 126 may also be provided, forming one or more internal sections 124. In various embodiments, the battery housing 100 may also optionally include one or more ribs 130, for example, but not limited to, bottom ribs 130.

Figure 17:
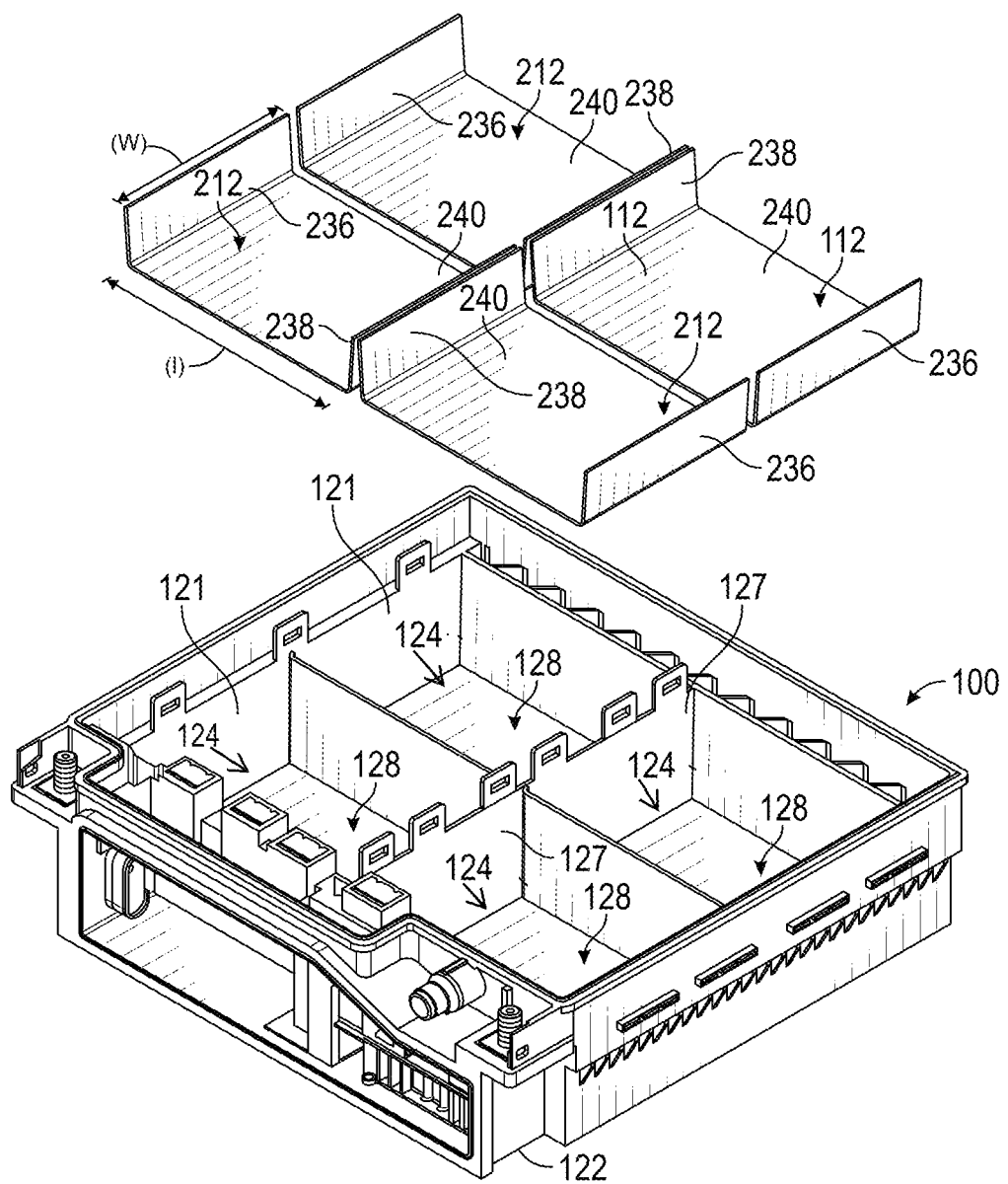
FIG. 17 is an exploded perspective view of the battery housing shown in FIG. 5, showing the heat sink(s) separated from the housing.

In FIGS. 13-17, one or more alternative examples of a heat sink 212 are provided within the battery housing 100, and in particular within the internal sections 124. As illustrated, one or more heat sink(s) 212 are aligned along a bottom surface 128 of housing 100 or internal sections 124. Referring to FIG. 17, the heat sink(s) 212 may have a first wall segment 236 and an opposing second wall segment 238, each segment extending at an angle from and spaced apart by a bottom segment 240. Each wall segment 236, 238 and the bottom segment 240 may be generally planar. The first wall segment 236 and second wall segment 238 may extend generally perpendicularly from the bottom segment 240. In some examples, the respective segments 236, 238, 240 may be integrally connected; that is, formed as a single unit. Accordingly, the heat sink 212 may be generally U-shaped. As a result, when the heat sink 212 is inserted into the housing 100 as shown in FIGS. 13-17, that first wall segment 236 and second wall segment 238 on the two sides of the heat sink 212 may abut or be positioned adjacent to the walls of the housing 100 making up an internal section 124 of the battery housing 100. In the illustrated embodiment the first wall segment 236 is positioned against or abuts an interior portion 121 of the exterior wall 120 and the second wall segment 238 is positioned against or abuts a surface of segment 127 of the interior wall 126. The first wall segment 236 and second wall segment 238 of the heat sink 212 may extend along at least a portion of the interior of each wall 120, 126. The first wall segment 236 and second wall segment 238 have a height which is shorter than the height of the exterior wall 120. FIG. 17 illustrates four U-shaped heat sinks 212 provided into a battery housing 100.

Figure 18:
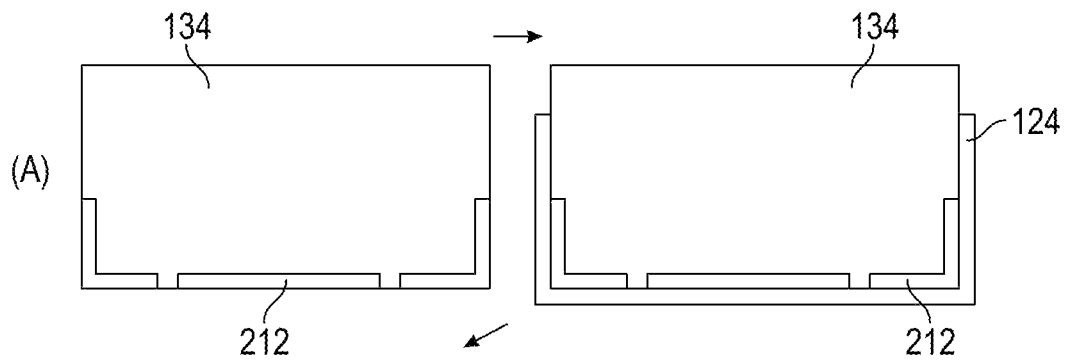
FIG. 18 illustrates a partial cross section, step view of the insertion of a heating fixture and heat sink into the battery housing according to one or more alternative examples of embodiments.
Figure 19:
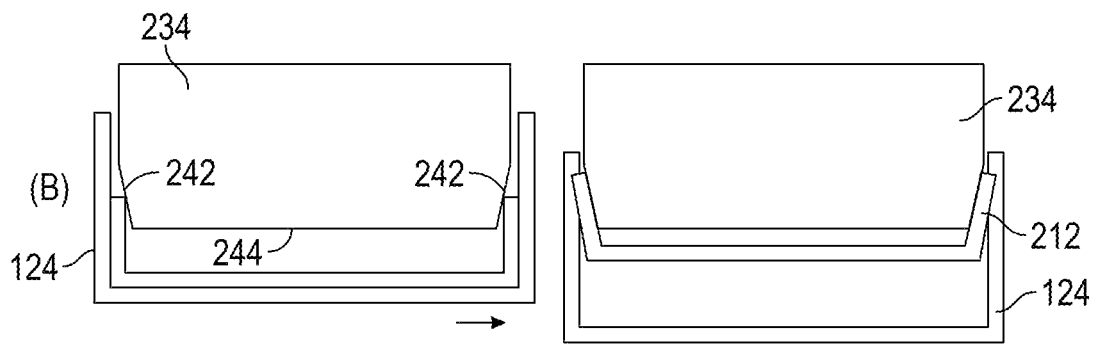
FIG. 19 illustrations a partial cross section view of a battery housing with heat sink and isolation component according to one or more examples of embodiments.
Figure 19:
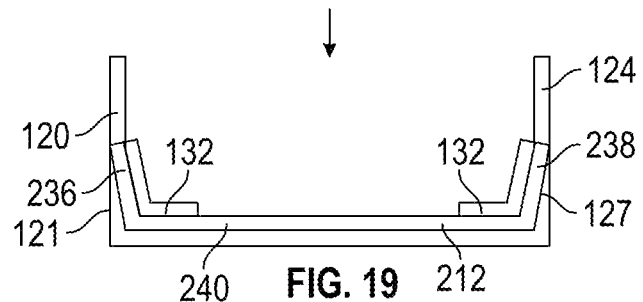
Figure 20:
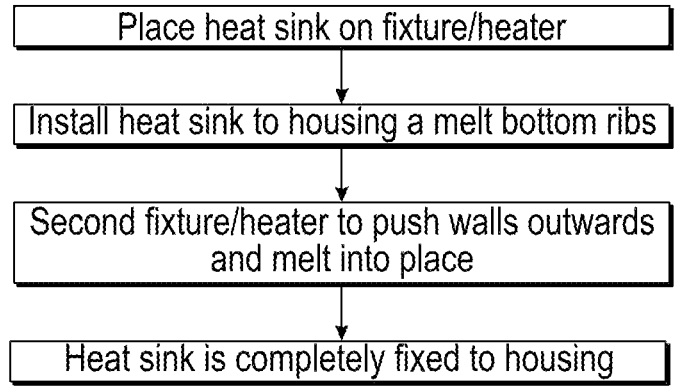
FIG. 20 is an example workflow of a method for providing a heat sink into a battery housing according to one or more alternative examples of embodiments.

Referring to FIGS. 18-20, a system and method of installation of the alternative examples of embodiments of a heat sink 212 into the battery housing 100 described in FIGS. 13-17 will be discussed. Accordingly, a battery housing 100 may be provided. Similar to the embodiments described in reference to FIGS. 10-12, in step (A) first the heat sink 212, which may be a U-shaped plate, may be installed onto or attached to a heating fixture 134. Next, the heating fixture 134 and the heat sink 212 plate may be provided into (e.g., lowered) into the battery housing 100. The heat sink 212 plate and fixture 134 are provided together into a battery housing 100 and pressed into the battery housing 100. As shown in the illustrated example of FIG. 18, the heat sink 212 remains attached to the heating fixture 134 when inserted into the battery housing 100. Insertion is made into an internal section 124 of the battery housing 100. The heat from the fixture 134 may then transfer through the plate (heat sink 212) and into the battery housing 100, melting the plastic (for example, but not limited to, polypropylene), plastically deforming the material and at least partially affixing the heat sink 212 plate and battery housing 100. In other words, the heating fixture 134 presses the bottom of the heat sink 212 into the plastic battery housing 100. The heat transfer from the fixture 134 through the heat sink 212 melts the battery housing plastic to create a solid joinder or bond between the battery housing 100 and heat sink 212.

However, unlike the embodiment shown in FIGS. 10-12, in the presently described examples, as shown in step (B) a second heating fixture 234 may be introduced into the battery housing 100. The second heating fixture 234 with a tapered profile is moved into the internal section 124 of the housing 100 and the heat sink 212 and forces the vertical walls or wall segments 236, 238 of the heat sink 212 outwards through the same pressure and heat transfer method described above. As shown in FIG. 18, the second heating fixture 234 may have a larger width than the first heating fixture 134. The second heating fixture 234 may also have tapered sidewalls 242 which taper inwardly toward the insertion end 244 of the heating fixture. In the illustrated embodiment, only a portion of each sidewall 242 is tapered. The second heating fixture 234 taper and increased width enables the fixture 234 to press against the first and second segments 236, 238 of the heat sink 212, which are generally vertical walls in the illustrated examples, when the second fixture 234 is inserted (Note: FIG. 18 illustrates this concept in an exaggerated manner and shows the heat sink and fixture 234 elevated from the bottom of the internal section 124 for ease of visibility). Because of the taper, width, and heat, the fixture 234 forces the heat sink 212 first and second segments 236, 238 outwards into battery housing material. That is, insertion of the second heating fixture 234, while heated, presses the sidewalls or first wall segment 236 and second wall segment 238 of the heat sink 212 into the walls 120, 126 of the battery housing 100, e.g., the exterior wall 120 and interior wall 126, allowing for plastic to plastically deform and spread or mushroom over a portion of the heat sink 212. The heat sink 212 may then be attached or at least partially embedded into the walls of the battery housing 100.

The second heating fixture 234 may then be removed (see FIG. 19). Finally, in some examples of embodiments, an isolation component or sheet 134 may be provided to separate the housing 100 and/or heat sink 212 from an inserted battery element or cell 110 (see FIG. 19).

The heating fixture 134, 234 carries the heat sink 212 and transfers heat into the battery housing 100 through the heat sink 212. The heating fixture 134, 234, in various embodiments, may therefore comprise a block having two dimensions (w) (1) which are the same approximate dimensions as the heat sink 212, or slightly larger than the heat sink 212. In one or more examples of embodiments, the heating fixture 234 may have a varied profile (for example, the second heating fixture 234 as shown in FIG. 18 may have a tapered profile). The heating fixture 134, 234 may comprise a solid steel block; however, other materials accomplishing the purposes provided should be contemplated as within the scope of this disclosure.

Accordingly, a battery housing 100 for a battery module 20 is provided. The battery housing 100 has a plurality of exterior walls 120 surrounding a base 122 forming an internal section 124 which is configured to receive one or more battery cells 110. The internal section 124 has a bottom surface 128. A heat sink 112 or 212 is joined to the bottom surface 128 of the battery housing 100 by a plastic deformation of a portion of the housing 100. A cover encloses the internal section 124 of the battery housing 100. The heat sink 112 or 212 being provided between the battery cells 110 and the housing base 122.

In one or more examples of embodiments, the housing 100 comprises a plurality of interior walls 126, wherein one or more exterior walls 120 and one or more interior walls 126 form the internal section 124. In this regard, the housing 100 may also comprise a plurality of internal sections 124, and a plurality of heat sinks 112 or 212 joined to the battery housing 100 in the plurality of internal sections 124.

In one or more examples of embodiments, the heat sink 112 or 212 is joined to the bottom surface 128 by one or more plastically deformed ribs 130. The one or more plastically deformed ribs 130 may extend over an edge and a portion of a surface of the heat sink 112. In the examples of embodiments described herein the heat sink may be a planar plate 112 or alternatively may be a U-shaped plate 212. In the examples of embodiments in which a U-shape heat sink 212 is provided a first wall segment 236 and a second wall segment 238 of the U-shape plate are at least partially embedded in a respective first sidewall 120 and second sidewall 126 of the internal section 124 of the battery housing 100.

A battery module 20 is also disclosed. The battery module 20 comprises a battery housing 100 having a plurality of exterior walls 120 surrounding a base 122 forming an internal section 124 which receives one or more battery cells 110. The internal section 124 has a bottom surface 128. A heat sink 112 or 212 is joined to the bottom surface 128 of the battery housing 100 by a plastic deformation of a portion of the housing 100. A plurality of battery cells 110 are seated on top of the heat sink 112 or 212 in the internal section 124. A cover 104 encloses the internal section 124 and plurality of battery cells 110. In one or more examples of embodiments, an isolation component 132 may be provided between the plurality of battery cells 110 and the heat sink 112 or 212.

A method of installation of a heat sink 112 or 212 in a battery housing 100 for a battery module 20 is also disclosed. The method includes the steps of: providing a battery housing 100 comprised of plastic and having an internal section 124 formed by a plurality of exterior walls 120 surrounding a base 122, the internal section 124 having a bottom surface 128; installing a heat sink 112 or 212 on a heating fixture 134; moving a heating fixture 134 with installed heat sink 112 or 212 into the internal section 124 of the battery housing 100; pressing the heat sink 112 or 212 into the bottom surface 128 while heating with the heating fixture 134 to at least partially melt the plastic and affix the heat sink 112 or 212 to the housing 100; and removing the heating fixture 134 from the housing 100.

In one or more examples of embodiments, the internal section 124 of the battery housing 100 has one or more ribs 130, and wherein the heating fixture 134 plastically deforms the one or more ribs 130. In one or more alternative examples of embodiments, the heat sink 212 has a U-shape profile and further comprising the steps of: introducing a second heating fixture 234 into the battery housing 100, the second heating fixture 234 having a tapered profile; wherein movement of the second heating fixture 234 into the battery housing 100 and heating presses first and second sidewalls 236, 238 of the heat sink 212 into first and second walls 120, 126 of the internal section 124 of the battery housing 100, and at least partially embeds the heat sink 212 in the housing 100; and removing the second heating fixture 234 from the housing 100.

Accordingly, a heat sink and fixation method for a battery is provided which solves one or more of the deficiencies with existing devices. The heat sink and fixation method provides improved consistency of fixation of the heat sink to the battery housing.

For example, the disclosed heat sink and fixation method may allow for the battery housing material to melt over the heat sink for robust connection between the heat sink and battery housing. Further, the disclosed in various embodiments may allow for ease of manufacture. In addition, the disclosed may allow for no extraneous fixation devices such as screws to be introduced into the battery housing, preventing risks of puncture and damage to battery cells (which may be a particular risk when the battery used is in a vehicle and an accident or impact occurs).

The disclosed system and method may have a number of additional advantages.

For example, traditional methods of installing a heat sink include introducing undercuts into the interior walls of the battery housing, and installing an aluminum heat sink into the undercuts. In this traditional method, the heat sink is manufactured in a size which is larger than the internal section and must be flexed during insertion so that it can seat into the undercuts. In comparison, in the method described herein, there is no reliance on heat sink sheet flexing or the complication of introducing undercuts in the plastic battery housing. Therefore, the disclosed system and method may be understood as an improvement upon traditional methods which rely on aluminum flexing to engage with an undercut in the battery housing. The heat sink described herein does not require the use of additional fastening hardware or complicated over-molding. Moreover, the heat sink becomes integral with the plastic battery housing. The system disclosed also may ensure maximum heat transfer between the heat sink and the battery housing, and out to the external environment.

Accordingly, the battery module, battery housing, and system having a heat sink, as well as the method of manufacturing or installation of a heat sink described herein meet the needs of thermal management and overcome one or more of the deficiencies of prior devices and processes.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments.

Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A battery housing for a battery module comprising:
   a plurality of exterior walls surrounding a base forming an internal section which is configured to receive one or more battery cells;
   a bottom surface in the internal section;
   a heat sink joined to the bottom surface of the battery housing by a plastic deformation of a portion of the housing, the heat sink being a U-shape plate, wherein a first wall segment and a second wall segment of the U-shape plate are at least partially embedded in a respective first sidewall and second sidewall of the internal section of the battery housing; and
   a cover enclosing the internal section.

2. The battery housing of claim 1, wherein the heat sink is joined to the bottom surface by one or more plastically deformed ribs.

3. The battery housing of claim 2, wherein the one or more plastically deformed ribs extend over an edge and a portion of a surface of the heat sink.

4. The battery housing of claim 1, further comprising a plurality of interior walls, wherein one or more exterior walls and one or more interior walls form the internal section.

5. The battery housing of claim 4, comprising a plurality of internal sections.

6. The battery housing of claim 5, comprising a plurality of heat sinks joined to the battery housing in the plurality of internal sections.

7. A battery module having the battery housing of claim 1 and a plurality of battery cells provided in the internal section, wherein the heat sink is provided between the plurality of battery cells and 2024, or wherein the plurality of battery cells is seated on top of the heat sink in the internal section and the cover is enclosing the internal section and the plurality of battery cells.

8. The battery module of claim 7, further comprising an isolation component between the plurality of battery cells and the heat sink.

9. A method of installation of a heat sink in a battery housing for a battery module comprising:
   providing the battery housing comprised of plastic and having an internal section formed by a plurality of exterior walls surrounding a base, the internal section having a bottom surface;
   installing the heat sink on a heating fixture;
   moving the heating fixture with installed heat sink into the internal section of the battery housing;
   pressing the heat sink into the bottom surface while heating with the heating fixture to at least partially melt the plastic and affix the heat sink to the housing; and
   removing the heating fixture from the housing.

10. The method of claim 9, wherein the internal section of the battery housing has one or more ribs, and wherein the heating fixture plastically deforms the one or more ribs.

11. The method of claim 9, wherein the heat sink has a U-shape profile and further comprising the steps of:
   introducing a second heating fixture into the battery housing, the second heating fixture having a tapered profile;
   wherein movement of the second heating fixture into the battery housing and heating presses first and second sidewalls of the heat sink into first and second walls of the internal section of the battery housing, and at least partially embeds the heat sink in the housing; and
   removing the second heating fixture from the housing.

12. The method of claim 9, further comprising providing an isolation sheet to separate an inserted battery element from the heat sink and housing.

13. A battery module comprising:
   a battery housing having a plurality of exterior walls surrounding a base forming an internal section which receives one or more battery cells, a bottom surface in the internal section, and a heat sink joined to the bottom surface of the battery housing by a plastic deformation of a portion of the housing;
   a plurality of battery cells seated on top of the heat sink in the internal section; and
   a cover enclosing the internal section and plurality of battery cells.

14. The battery module of claim 13, wherein the heat sink is joined to the bottom surface by one or more plastically deformed ribs.

15. The battery module of claim 14, wherein the one or more plastically deformed ribs extend over an edge and a portion of a surface of the heat sink.

16. The battery module of claim 13, wherein the heat sink is a planar plate.

17. The battery module of claim 13, wherein the heat sink is a U-shape plate.

18. The battery module of claim 17, wherein a first wall segment and a second wall segment of the U-shape plate are at least partially embedded in a respective first sidewall and second sidewall of the internal section.

19. The battery module of claim 13, further comprising a plurality of interior walls, wherein one or more exterior walls and one or more interior walls form the internal section.

20. The battery module of claim 19, comprising a plurality of internal sections.

21. The battery module of claim 20, comprising a plurality of heat sinks joined to the battery housing in the plurality of internal sections.

22. The battery module of claim 13, further comprising an isolation component between the plurality of battery cells and the heat sink.

* * * * *